United States Patent
Dheap et al.

(10) Patent No.: US 10,062,085 B2
(45) Date of Patent: *Aug. 28, 2018

(54) APPLYING RELATIVE WEIGHTING SCHEMAS TO ONLINE USAGE DATA

(71) Applicant: INTERNATIONAL BUSINESS MACHINES CORPORATION, Armonk, NY (US)

(72) Inventors: Vijay Dheap, Durham, NC (US); Jimmy Ming-Der Hsu, Austin, TX (US); Michael David Whitley, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 310 days.

This patent is subject to a terminal disclaimer.

(21) Appl. No.: 14/927,122

(22) Filed: Oct. 29, 2015

(65) Prior Publication Data

US 2016/0048851 A1 Feb. 18, 2016

Related U.S. Application Data

(63) Continuation of application No. 12/646,301, filed on Dec. 23, 2009, now Pat. No. 9,247,012.

(51) Int. Cl.
 *G06F 3/048* (2013.01)
 *G06Q 30/02* (2012.01)
 *H04L 29/08* (2006.01)

(52) U.S. Cl.
 CPC ......... *G06Q 30/0201* (2013.01); *G06Q 30/02* (2013.01); *H04L 67/22* (2013.01); *G06F 2201/88* (2013.01)

(58) Field of Classification Search
 CPC .................. H04L 67/22; G06Q 30/22
 (Continued)

(56) References Cited

U.S. PATENT DOCUMENTS 5,195,178 A 3/1993 Krieger et al.
6,917,902 B2 7/2005 Alexander
(Continued)

FOREIGN PATENT DOCUMENTS

CN 101304411 A 11/2008
GB 20090177644 A1 7/2009
(Continued)

OTHER PUBLICATIONS

Final Office Action issued in U.S. Appl. No. 11/867,473 dated Nov. 25, 2011.
(Continued)

*Primary Examiner* — William Titcomb
(74) *Attorney, Agent, or Firm* — Sughrue Mion, PLLC

(57) ABSTRACT

Systems, methods and articles of manufacture allow adjusting the relative weighting associated with evaluation criteria associated with a unified view of dissimilar data. The operation generally includes collecting data regarding attributes of a user interacting with an application, where the collected data has associated evaluation criteria. The data is collectively represented according to the evaluation criteria. The systems, methods and articles of manufacture then allow dynamically modifying the evaluation criteria before evaluating and collectively representing the data according to the adjusted criteria.

27 Claims, 5 Drawing Sheets

(58) Field of Classification Search
USPC .......................................................... 715/704
See application file for complete search history.

(56) References Cited

U.S. PATENT DOCUMENTS

| | | | |
|---|---|---|---|
| 7,062,496 | B2 | 6/2006 | Dettinger et al. |
| 7,092,844 | B1 | 8/2006 | Young et al. |
| 7,103,609 | B2 | 9/2006 | Elder et al. |
| 7,120,880 | B1* | 10/2006 | Dryer ..................... G06Q 30/02 715/831 |
| 7,269,643 | B2 | 9/2007 | Spaid |
| 7,383,334 | B2 | 6/2008 | Wong et al. |
| 7,536,405 | B2 | 5/2009 | Tschiegg et al. |
| 7,551,172 | B2* | 6/2009 | Yaron ..................... G06Q 30/02 345/419 |
| 7,720,835 | B2* | 5/2010 | Ward ...................... G06Q 50/01 707/710 |
| 7,818,721 | B2 | 10/2010 | Sundararajan et al. |
| 8,219,531 | B2* | 7/2012 | Eagan ............... G06F 17/30389 705/32 |
| 8,234,582 | B1* | 7/2012 | Haynes .................. G06Q 30/02 715/736 |
| 8,380,594 | B2 | 2/2013 | Berkman et al. |
| 8,504,348 | B2* | 8/2013 | Error .................. G06F 11/3612 703/22 |
| 8,504,488 | B2 | 8/2013 | Dutta et al. |
| 2002/0070953 | A1* | 6/2002 | Barg ...................... G06Q 10/10 715/700 |
| 2002/0138764 | A1 | 9/2002 | Jacobs et al. |
| 2002/0147805 | A1 | 10/2002 | Leshem et al. |
| 2004/0174397 | A1* | 9/2004 | Cereghini .............. G06Q 30/02 715/855 |
| 2005/0039172 | A1 | 2/2005 | Rees et al. |
| 2005/0216844 | A1 | 9/2005 | Error et al. |
| 2006/0015854 | A1 | 1/2006 | Muhlestein et al. |
| 2006/0136964 | A1 | 6/2006 | Diez et al. |
| 2006/0277212 | A1 | 12/2006 | Error |
| 2007/0150372 | A1 | 6/2007 | Schoenberg |
| 2008/0052153 | A1 | 2/2008 | Cook |
| 2008/0086454 | A1 | 4/2008 | Bahadori et al. |
| 2008/0168020 | A1 | 7/2008 | D'Ambrosio |
| 2008/0181463 | A1 | 7/2008 | Error |
| 2008/0184116 | A1 | 7/2008 | Error |
| 2010/0070876 | A1* | 3/2010 | Jain ....................... G06Q 30/02 715/748 |
| 2010/0275128 | A1* | 10/2010 | Ward ..................... G06Q 10/06 715/744 |
| 2011/0055250 | A1 | 3/2011 | Nandy et al. |
| 2011/0061013 | A1 | 3/2011 | Bilicki et al. |
| 2011/0154239 | A1* | 6/2011 | Dheap .................... G06Q 30/02 715/771 |
| 2012/0078710 | A1 | 3/2012 | Cramer |

FOREIGN PATENT DOCUMENTS

| | | |
|---|---|---|
| GB | 7941394 B2 | 5/2011 |
| JP | 2008-546093 A | 12/2008 |
| JP | 2009-533962 A | 9/2009 |

OTHER PUBLICATIONS

Goldstein, J. et al., "A Framework for Knowledge-based, Interactive Data Exploration", Journal of Visual Languages and Computing, Dec. 5, 1994, pp. 339-363.
Gray, J. et al., "Data Cube: A Relational Aggregation Operator Generalizing Group-By, Cross-Tab, and Sub-Totals", Data Mining and Knowledge Discovery, 1997, 1, 29-53, Kluwer Academic Publishers, The Netherlands.
Gunay, A. et al., "Semantic Matchmaking of Web Services Using Model Checking"; (2008), Proc. of 7$^{th}$ Int. Conf. on Autonomous Agents and Multiagent Systems (AAMAS 2008), Padgham, Parkes, Muller and Parsons (eds.), May 12-16, 2008, Estoril, Portugal, pp. 273-280.
Ben Shneiderman, Inventing Discovery Tools: Combining Information Visualization with Data Mining, Information Visualization, 2002, 5-12, 1.
Chinese Office Action cited in Chinese Application No. 201080058487.9, dated Mar. 5, 2014.
Examination Report dated Jun. 10, 2015, issued in British Patent Application No. GB1210731.4.
Van Der Graff, P., "Linklove: Filters in Google Analytics," VDGraff Info, Feb. 21, 2007.
Webtrends Inc., Marketing Warehouse on Demand User's Guide, WebTrends Marketing Lab 2, Jun. 30, 2008, pp. 1-56, Portland, Oregon, USA.
IBM TDB, "Method of Automatically Collecting Performance and Capacity Data from Customer IT System, Analyzing the Data and then Delivering Graphical Reports back to the Customer via the Internet" IP.com, p. 1, Mar. 13, 2002.
Li, Y. et al..,"A Two-StageText Mining Model for Information Filtering," CIKM '08, Oct. 26-30, 2008, pp. 1023-1032, Napa Valley California, USA.
McCartney, T. P. et al., "End-User Visualization and Manipulation of Distributed Aggregate Data", 1997.
Non Final Office Action issued in U.S. Appl. No. 11/867,473 dated Apr. 28, 2011.
Rangaswamy, S., et al. "IBM WebSphere Developer Technical Journal: Writing a Performance Monitoring Tool Using WebSphere Application Server's Performance Monitoring Infrastructure API," IBM Corp., Feb. 2002.
International Search Report dated Mar. 22, 2011, for International Application No. PCT/EP2010/068456.
Amendment to Examination Report issued in British Patent Application No. 1210731.4, dated Oct. 8, 2015.
Communication dated Feb. 23, 2016, from the United Kingdom Intellectual Property Office in counterpart application No. GB1210731.4.

* cited by examiner

APPLYING RELATIVE WEIGHTING SCHEMAS TO ONLINE USAGE DATA

CROSS-REFERENCE TO RELATED APPLICATIONS

This application is a continuation of U.S. application Ser. No. 12/646,301 filed Dec. 23, 2009, the disclosure of which is hereby incorporated by reference in its entirety.

BACKGROUND

The present invention relates generally to the customization of collected data in a data processing system. More particularly, the invention relates to dynamically modifying criteria used by monitoring software.

The Web is increasingly becoming an interactive data exchange forum, where users submit content to Web servers, which is shared with other users, sometimes after processing. This evolution of the World Wide Web is sometimes referred to as Web 2.0, wherein applications promote collaboration and information sharing among large groups of users. Traditionally, owners of Web servers have competed for consumer attention by providing customer desired offerings, for which they are financially rewarded through advertising revenue, goodwill, lower customer service costs, resale of metrics of usage patterns, usage fees, and the like. A fundamental paradigm of Web 2.0 is to grant end-users (those users other than the originator) the privileges to read/write/update data, meter transactions, monitor usage, dynamically apply "what if's" to the collected data and otherwise monetize value of existing applications and data—tasks traditionally reserved to application developers.

Web services add a further complication to this already dynamic environment. Web services are independent software modules adhering to known standards, such as those published by the World Wide Web consortium (W3C). Web services are often created by third party developers, which are integrated into Web based offerings of other vendors that enhance a functionality of these offerings. In addition to Web services, other software assets have emerged that represent enhancements to offerings of other vendors. These assets include, for example, Web content, widgets, mashups, service oriented architecture (SOA) applications, and the like.

In many situations, a single solution utilized by a user is formed from many assets by multiple different providers. The solution itself can represent a remixing of content and services by the providers themselves or by middlemen into solutions that are consumed by users as a single view. Additionally, services and content can vary in granularity. Some can be fine grained, while others can be delivered in bulk. For example, business information can be tailored for delivery to a single company compared to delivering business information to a set of one thousand companies (e.g., Dun and Bradstreet business information).

Increasingly, an issue of providing a unified view of dissimilar data is arising. Gathering any data is linked to the challenge of determining what specific facts, statistics or items of information are to be monitored, stored and tracked. Representing a unified view of dissimilar data is likewise linked to the challenge of determining the relative importance, or weighting, each set of data should be afforded with respect to all other data in the collective representation. What's more, representing an updated view of the data in a "what if" scenario, where the relative weighting of the data is adjusted, presents a further challenge.

SUMMARY

The present invention can be implemented in accordance with numerous aspects consistent with the material presented herein. One embodiment of the invention includes a computer implemented method. The method may generally include collecting data regarding attributes of a user interacting with an application, where the collected data has certain evaluation criteria. The data is collectively represented according to the criteria. A mechanism for dynamically adjusting the evaluation criteria assigned to selected data attributes is provided. The evaluation criteria may then by adjusted and applied to the collected data. The data is evaluated according to the adjusted criteria and collectively represented.

Another embodiment of the invention includes a computer readable medium, containing a program which, when executed on a processor, performs an operation. The operation may generally include collecting data regarding attributes of a user interacting with an application, where the collected data has associated evaluation criteria. The data is collectively represented according to the criteria. A mechanism for dynamically adjusting the evaluation criteria assigned to selected data attributes is provided. The evaluation criteria may then be adjusted and applied to the collected data. The data is then evaluated according to the adjusted criteria and collectively represented.

Still another embodiment of the present invention can include a system having one or more processors and a memory containing a program, which is configured to perform an operation. The operation may generally include collecting data regarding attributes of a user interacting with an application, where the collected data has associated evaluation criteria. The data is collectively represented according to the criteria. A mechanism for dynamically modifying the evaluation criteria assigned to selected data attributes is provided. The evaluation criteria may be adjusted and collectively represented according to the adjusted criteria.

Another embodiment of the invention includes a computer implemented method. The method may generally include collecting transaction data regarding attributes of a user interacting with an application, where the collected transaction data has certain evaluation criteria. The transaction data are stored in a data structure. A mechanism for dynamically adjusting the evaluation criteria assigned to selected data attributes is provided. The stored transaction data may then be modified by applying the adjusted evaluation criteria to the transaction data, where the data structure is suitable for use in representing the transaction data via a display.

Another embodiment of the invention includes a computer readable medium, containing a program which, when executed on a processor, performs an operation. The operation may generally include collecting transaction data regarding attributes of a user interacting with an application, where the collected transaction data has certain evaluation criteria. The transaction data are stored in a data structure. A mechanism for dynamically adjusting the evaluation criteria assigned to selected data attributes is provided. The stored transaction data may then be modified by applying the adjusted evaluation criteria to the transaction data, where the data structure is suitable for use in representing the transaction data via a display.

Still another embodiment of the present invention can include a system having one or more processors and a memory containing a program, which is configured to perform an operation. The operation may generally include collecting transaction data regarding attributes of a user interacting with an application, where the collected transaction data has certain evaluation criteria. The transaction data are stored in a data structure. A mechanism for dynamically adjusting the evaluation criteria assigned to selected data attributes is provided. The stored transaction data may then be modified by applying the adjusted evaluation criteria to the transaction data, where the data structure is suitable for use in representing the transaction data via a display.

Another embodiment of the present invention is a computer implemented process to enable monitoring software. The process includes installing first computer instructions onto a computer readable medium, where the instructions are configured to collect transaction data regarding attributes of a user interacting with an application and the transaction data has associated evaluation criteria. The process also includes installing second computer instructions onto a computer readable medium, said second computer instructions configured to store the transaction data evaluated according to the evaluation criteria. The process further includes installing third computer instructions onto a computer readable medium, where the third computer instructions are configured to provide a mechanism for dynamically adjusting said evaluation criteria assigned to selected data attributes and the said mechanism may be dynamically modified. The process further includes installing fourth computer instructions onto a computer readable medium, where the fourth computer instructions are configured to modify the stored transaction data by applying the adjusted evaluation criteria to said transaction data, wherein the data structure is suitable for use in representing the transaction data via a display.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION

Figure 1:
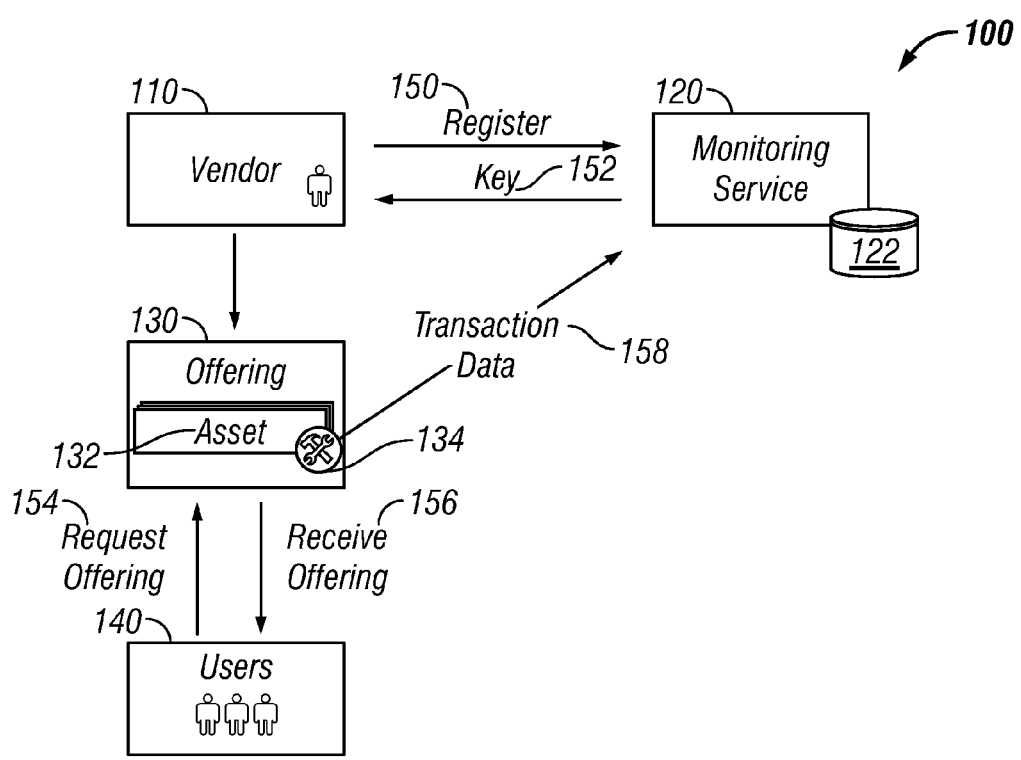
FIG. 1 is a schematic diagram of a system showing an asset monitoring framework for deployable software assets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It is to be understood that a subsequent installation of a program embodied in the computer readable medium is orchestrated by an "install" program, which is essentially an agent of the software manufacturer carrying out the installation steps. In so doing, the program is transformed from an unusable, un-executable state to a useful, ready to execute form.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram of a system 100 showing an asset monitoring framework for runtime, deployment time, and/or development time configuration of deployable software assets. In system 100, a vendor 110 can register 150 an offering 130 with a metering, monitoring, and monetizing service 120. The service 120 can provide the vendor 110 with a unique key 152 associated with the registered offering, which can be an automatically generated key or one that is manually established. The vendor 110 can instrument the offering 130 using the unique key. The offering 130 can include one or more software assets 132 and instrumentation can occur at an asset 132 level. Users 140 can then request 154 and receive 156 the offering 130. Transaction data 158 can be recorded for interactions between the offering 130 and the users 140. This transaction data 158 can be conveyed to the service 120, where it can be processed by service 120. Processing results and raw data can be stored in database 122. The vendor 110 can request and receive reports and other information concerning the offering 130 through the service 120. Security for the stored and processed transaction data 158 can be maintained so that it is available only to authorized agents appointed by the vendor 110.

System 100 has numerous unique improvements over conventional asset monitoring solutions. One improvement is that in system 100 a relationship between vendors 110 and users 140 is kept confidential, which ensures that the vendor 110 continues to "own" the relationship. System 100 also permits vendors 110 to configure desired metrics at runtime, deployment time, or development time, such as through a configurable Consumer Data Record (CDR) that can be part of the instrumentation 134. Such metrics may include specific facts, statistics or items of information to be monitored, stored and tracked in database 122. Additionally, system 100 supports instrumentation 134 of content and services of varying granularity. When a software asset 132 includes multiple subcomponents, which can potentially be associated with different vendors, each of the subcomponents can be instrumented 134 separately, providing different levels of visibility into metrics depending on an instrumentation 134 level that a vendor is authorized to access. In one contemplated embodiment, the users 140 can be permitted to access the service 120, either directly or through a vendor supplied interface, to view their consumption habits.

Another significant improvement of system 100 is that it permits a user to collectively represent a set of dissimilar data stored in database 122. For example, a vendor 110 can register authorized users 140 for a software asset 132. Evaluation criteria can be defined within the instrumentation 134. Attributes associated with various data are stored in database 122. The data may include transaction statistics, information representing sales statistics or other raw information. The set of available attributes in the data (i.e. list of the data fields in the available data) is part of the program state and, as such, may be stored in a database table apart from data to be processed. Other program state examples may include other data—such as evaluation criteria selected by a user, program settings or default values. The stored data may then be retrieved using evaluation criteria and collectively represented according to a relative importance, or weighting, assigned to each criteria. The weighting assigned to any one set of criteria, relative to other criteria, may either be set by the application or defined by the user. Moreover, as an aspect of the present invention, the evaluation criteria may be modified and manipulated by the user—thereby offering an ability to assess the impact of shifting the relative weighting from one set of criteria to another. Filtering of evaluation criteria according to an embodiment of the invention may be binary. That is, the occurrence (or non-occurrence) of an attribute or criteria either exists or does not exist (e.g. is either a "1" or "0"). Such an embodiment may be implemented, for example, with a slider or switch having two states—"on" and "off". For example, if evaluating online sales, categories such as "books" or "electronics" may be available. Upon adjusting the "books" slider to "off", the weighting algorithm would perform an "isBook" check against each data entry (database table row) and if true (purchased item is in the "books" category) the data entry is filtered out by multiplying with a weight value of 0. The result is the visualization does not show sales in the "books" category, as those results are removed or ignored.

According to another embodiment, filtering threshold evaluation criteria may be implemented with a slider that adjusts a filter sensitivity value. For example, when evaluating online sales, a slider associated with "Customer Loyalty" may filter based on a minimum number of past purchases. If set to 0, the filter allows customers with 0 or more purchases—in effect, all customers. If set to 3, the filter would only show data from customers with 3 or more purchases. Data from customers with fewer than 3 purchases are removed or ignored. The net result is adjusting a higher slider setting causes data from more "loyal" customers to be displayed.

According to another embodiment, a weighting may be implemented by multiplying the data value with the slider setting. For example, consider the criteria "User Reputation". This criterion may range in value between 0 and 100 and could be based on a formula that factors in how often a user logs in, whether he contributes content or gets positive ratings. The slider can be set from 0.0 to 1.0. When set to 0, all User Reputation values are multiplied by 0, effectively being turned off. When set to 0.5, all User Reputation values are reduced by half. The net result is adjusting a higher weighting slider increases the display intensity of a particular criterion in the visualization.

Gathering any data is linked to the challenge of determining what specific facts, statistics or items of information is to be monitored, stored and tracked. Representing a collective representation of dissimilar data is likewise linked to the challenge of determining the relative importance, or weighting, each set of data should be afforded with respect to all other data in the collective representation.

The service 120 can be implemented in either a self-hosted system or within a third-party system, which permits vendor 110 to retain a consistent infrastructure for monitoring assets 132 regardless of an implementation framework used. Offloading overhead relating to monitoring the offering 130 by using third-party hosting can permit the vendor 110 to concentrate on core competencies. Self-hosting a monitoring capability can permit the vendor 110 to use software monitoring tools of choice and can permit the vendor 110 to operate autonomously from third party systems. Templates can be established for one or more Commercial-Off-the-Shelf (COTS) monitoring solutions so that instrumentation 134 of the offering 130 can remain consistent regardless of what monitoring solution is used. Consistent instrumentation 134 also permits a vendor 110 to switch monitoring solutions and/or to change whether monitoring service 120 is self hosted or hosted by a third-party without requiring extensive implementation specific customizations. Templates can also be used to OEM the metering, monitoring, and monetizing service into products and solutions.

As used herein, the vendor 110 can be an owner or provider of a software offering 130. A software offering 130 can include one or more software assets 132. Software assets 132 can include a variety of software services and content. The service 120 can be a software implemented service configured to track usage and content flows, monetize transactions, evaluate collected data, register consumers, manage multiple offerings 130 (e.g., group offer capabilities), establish limits and specification of value formulas, and the like. The monitoring service 120 permits a capturing and reporting of metrics relating to transactions (158) for each asset 132 along a content or service delivery cycle and to correlate these metrics for vendor 110 consumption.

The instrumentation 134 can decouple service 120 specifics from asset 132 specifics, which results in an extremely flexible and versatile infrastructure. For example, usage calculation algorithms, usage limitations, metric recordation specifics, default weightings assigned to certain data attributes, and the like can be specified within the instrumentation 134. This information can be altered by a vendor 110 during development, at runtime, and/or at deployment. In one embodiment, the instrumentation 134 can include capabilities to assign relative weightings to data attributes in a set of data that can be used to formulate a collective representation of the set. The architecture of system 100 also supports data portability, such as allowing additional analysis algorithms to be applied to the asset 132 via the instrumentation 134 either as plug-ins or by exporting the data.

Figure 2:
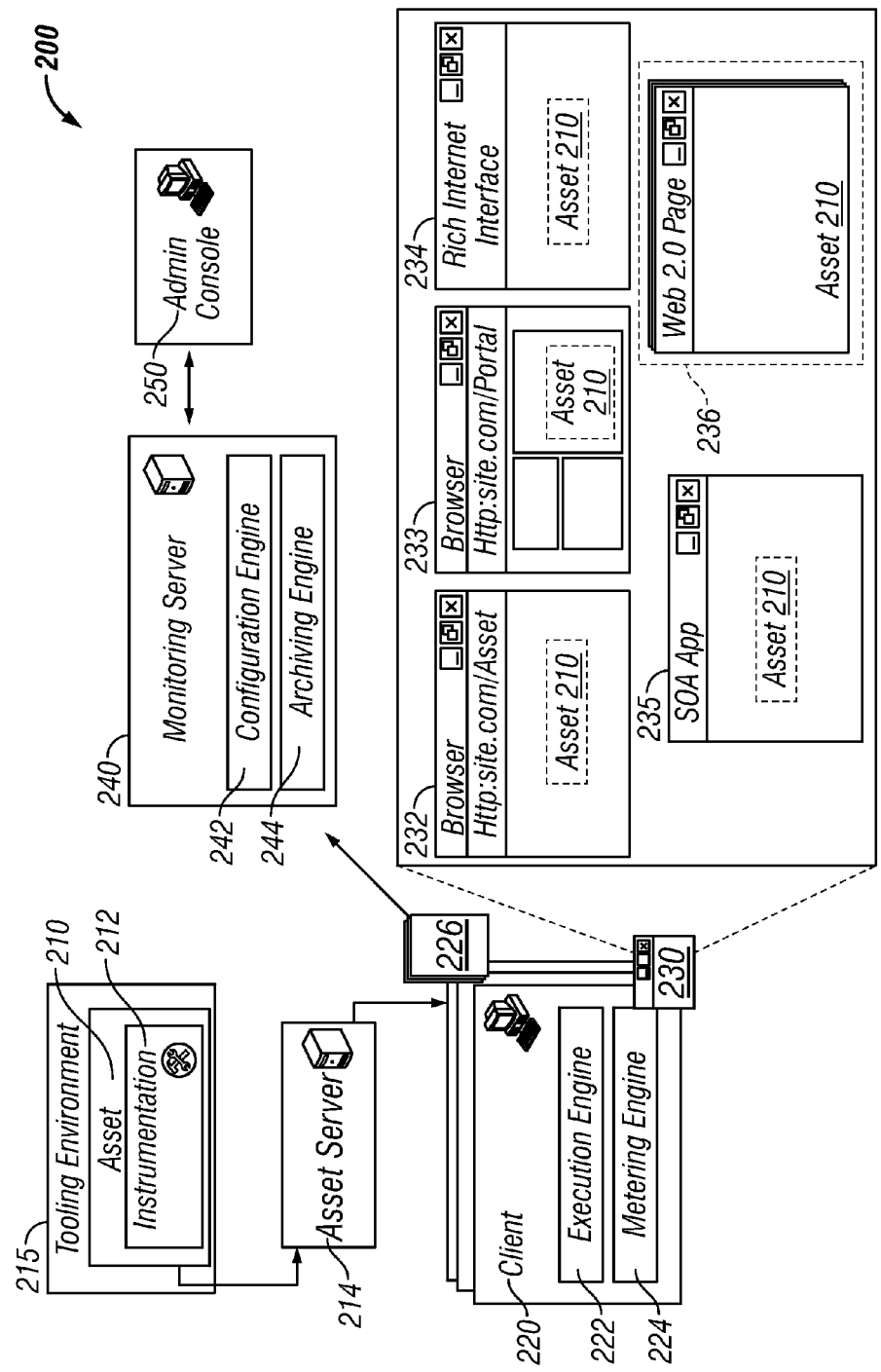
FIG. 2 is a schematic diagram of a system for an asset monitoring framework that permits runtime, deployment time, and/or development time instrumentation of deployable software assets in accordance with an embodiment of the inventive arrangements disclosed herein.

FIG. 2 is a schematic diagram of a system 200 for an asset monitoring framework that permits runtime, deployment time, and/or development time instrumentation of deployable software assets in accordance with an embodiment of the inventive arrangements disclosed herein. The system 200 is one contemplated implementation for the system 100 of FIG. 1.

System 200 shows that an asset 210 can be instrumented 212 and conveyed to an asset server 214, which one or more clients 220 access via an interface 230. When the asset 210 is accessed, transaction data 226 concerning the transaction can be conveyed to a monitoring server 240, which processes and archives the transaction data 226. An authorized vendor of the asset 210 can access the monitoring server 240 via an administration console 250 to receive reports/data concerning the monitored metrics. In one embodiment, the information provided to a vendor via the administration console 250 can include real-time or near real-time metrics.

To elaborate, in system 200, one or more assets 210 can be instrumented within a tooling environment 215. Instrumentation 212 can permit the asset 210 to transmit transaction data 226 when used by clients 220. In one embodiment, a standard asset monitoring application program interface (API) can be established. The instrumentation 212 can cause API calls to be made to track the metrics that are pertinent to the content or services that are to be tracked. A configurable metric specification section (e.g., Customer Data Record) of the instrumentation 212 can be used to define metrics that are to be tracked on an asset-by-asset basis. That is, different metrics can be tracked for different assets 210. In one embodiment, each asset 210 can be registered with a monitoring service, which creates a unique asset specific key.

Configuring the instrumentation 212 can occur in a pre or post asset 210 deployment stage. In a post asset 210 deployment stage, the asset owner need not have direct access to an asset executing entity (e.g., server 214 and/or client 220), and need not even be aware of where deployed assets are located. For example, a fact that communications are established between the monitoring server 240 and deployed assets 210 can be leveraged to make adjustments to deployed assets 210. That is, an authorized administrator using console 250 can make a run-time change for a set of assets 210 that are already being monitored by the server 240. These changes can be conveyed from the server 240 to the asset executing entity (server 214 and/or client 220), where changes to the instrumentation 212 (e.g., the Customer Data Record) can be dynamically made, which changes the content of subsequent transaction data 226 messages.

The tooling environment 215 can optionally include a toolkit for a software development platform, which automatically creates assets 210 that include stubs or interfaces for instrumentation 212. For example, if a software development platform was part of an IBM RATIONAL software development platform, a platform specific metering toolkit can facilitate the instrumentation 212 of assets 210. Specifications can be published for instrumentation 212 requirements so that metering toolkits for any software development platform can developed. In another example, a class or script can be designed to facilitate instrumentation 212 of assets 210, where in the tooling environment 215 the facilitating class or script can be added to asset 210 code. The tooling environment 215 cans also software wrap pre-existing assets 210 where the software wrapping includes the instrumentation 212 for monitoring the assets 210. Implementation specifics for the tooling environment 215 can vary based upon asset type 210 and/or based upon a platform for which the asset 210 is designed.

An asset 210 can represent any software object or set of objects able to be monitored using instrumentation 212. For example, asset 210 can include digitally encoded content, such as data, an electronic file, multimedia, a stream, a syndication, a Web page, a portal, a portlet, and the like. The asset 210 can also include a widget, a mashup, a service oriented architecture (SOA) application, a Web 2.0 environment, a Rich Internet Interface (RII) application, and the like. An asset 210 can be a component of another offering by a different vendor, which may or may not be monitored. Further, different assets 210 can monitor for different metrics, each being separately configurable.

Code associated with the assets 210 can execute on the asset server 214 and/or on the client 220. An execution engine 222 can execute a client-side portion of code for the assets 210 and/or an application needed to interact with the asset 214. For example, an asset 214 can be a Web page 232 having dynamic content processed by the server 214 presented within a Web browsing interface 232, code for which is executed by the execution engine 222. The asset 210 can be a portion of a served Web solution, such as a portlet, as shown by interface 233. Similarly, the asset 210 can represent a set of Web components, such as a Web 2.0 environment, as shown by interface 236. In one embodiment, an asset 210 can execute in a Rich Internet Interface (RII) 234, which case interface code for the RII can be executed by the engine 222. Additionally, the asset 210 can be a service oriented architecture asset 210 executing in an interface 235.

Regardless of a type 232-236 of interface 230 used to interact with the asset 210, metering the asset 210 can occur in a consistent fashion. In one implementation, the instrumentation 212 can include an executable designed to run on client 220 (e.g., specifically a client-side metering engine 224 can handle the executable), which generates transaction data 226. In another implementation, the instrumentation 212 can include configuration specific data for the asset 210, which is designed to be interpreted by a separate client-side executable (e.g., metering engine 224). Further, in one implementation a standard client-side program can execute on the client 220, such as a metering engine 224 that is implemented within a JAVA virtual machine. In still another implementation, an asset server 214 can perform at least a portion of the processing tasks needed to generate the transaction data 226.

The monitoring server 240 can receive the transaction data 226, which it can process in accordance with vendor configurable parameters. These parameters can be established using the configuration engine 242. Processing specifics can be established by a vendor at a time at which assets 210 are registered with the monitoring server 240 and/or at a later point in time. The monitoring server 240 can also include an archiving engine 244, which is used to store processed results of transactions and raw transaction data. The monitoring server 240 can be capable of tracking usage, content flows, monetizing transactions, managing multiple offerings (e.g., asset grouping capabilities), establishing limits and specification of value formulas, and the like. Functionality of the monitoring server 240 can utilize any of a variety of programmatic techniques for monitoring the assets. For example, techniques currently incorporated by existing software solutions, such as IBM's Web Analytics, WEB TRENDS solutions, URCHIN Web Analytics Software, CLICKTRACKS, AWStats, OMNITURE analytics software, etc., can be used by server 240. Additionally, templates can be designed for any of the aforementioned COTS analyzing solutions to make those solutions compatible with the instrumentation 212.

It should be noted that the infrastructure of system 200 allows metrics to be captured and recorded at multiple points of the software asset's solution delivery cycle. For example, front-end, back-end, and in-between metrics can be captured and conveyed to the monitoring server 240 as separate records. These separate records can be resolved and correlated using the unique key associated with the software asset 210.

The client 220 can represent any computing device that permits a user to interact with one or more assets 210 via interface 230. For example, the client 220 can be a personal computer, a server, a mobile telephone, a personal data assistant, an entertainment system, a media player, a wearable computing device, an embedded computing device, a virtual machine, and the like.

The components shown in system 200 (server 214, client 220, server 240, and console 250) can exchange information with each other over a network (not shown). The network can include components capable of conveying digital content encoded within carrier waves. The content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Additionally, each of the components of system 200 can have access to one or more data stores, within which digitally encoded information is stored. Each of these data stores can be physically implemented within any type of hardware including, but not limited to, a magnetic disk, an optical disk, a semiconductor memory, a digitally encoded plastic memory, a holographic memory, or any other recording medium. A data store can be stand-alone storage unit as well as a storage unit formed from a plurality of physical devices, which may be remotely located from one another. Additionally, information can be stored within a data store in a variety of manners. For example, information can be stored within a database structure or can be stored within one or more files of a file storage system, where each file may or may not be indexed for information searching purposes. The data stores can be optionally encrypted for security reasons.

Figure 3:
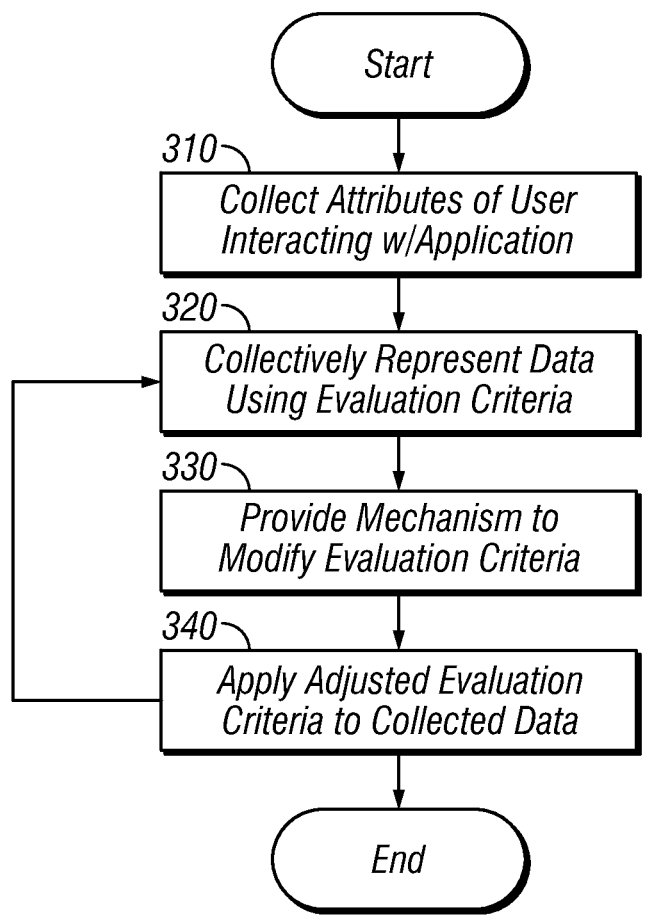
FIG. 3 is a flowchart depicting a method for dynamically modifying the relative weighting of evaluation criteria according to one embodiment of the invention.

Referring now in specific detail to the drawings, and particularly FIG. 3, illustrated is an information processing method 300 according to an embodiment of the invention. The method begins at step 310 where the software monitoring application collects attributes of a user interacting with an offering 130. Attributes are properties associated with a database entity and may be specified by either the application developer or the end user. It is to be understood that attributes and collected data can take on a variety of forms, including data itself or metadata. Attributes may likewise offer criteria upon which data from different users or sources can be compared. For example, attributes may include the frequency with which particular site is visited (IP hits), the online reputation of a particular user, or a moving "time window" reflecting what particular actions or events had taken place during a given time interval, geographic location of a user or event, the screen location of a user interaction, location where a user scrolls on a page, actions the user undertakes, length of time a user spends on the page, number of purchases by a user, total amount of purchases by user, and number of days since a last purchase by a customer.

Attributes could likewise include properties of metered data. Considering activities relating to blogs, for example, metrics might include tracking blog usage, creating a blog post, reading the post, adding a rating to the post, and adding a comment to the post. The significance or value of these different activities could be ranked differently. In this example, creating the blog post may be ranked most highly and reading the blog post least highly, with other blog related events being rank ordered in some objective or subject fashion in between. The degree to which one set of metrics relating to blog statistics would compare to another such set, could be assessed based upon which set of metrics embodied a greater number or degree of more highly ranked attributes.

Figure 5:
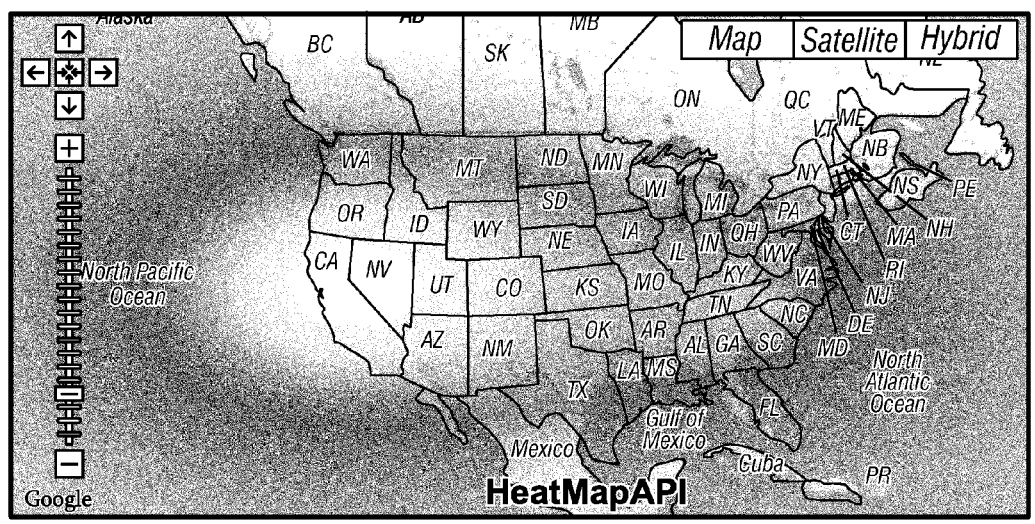
FIG. 5 is a graphical depiction of a heat map according to one embodiment of the invention.

The method continues at step 320 where data collected at step 310 is aggregated and collectively represented. Because the collected data is not necessarily of the same type, each data element is assigned a default weighting, against which the given element is applied. A summation of all data elements, scaled according to their respective default weightings, results in the collective representation of the collected data. In one embodiment of the invention, the collective representation may be displayed to the user via a heat map, for example, as shown in FIG. 5.

Figure 4:
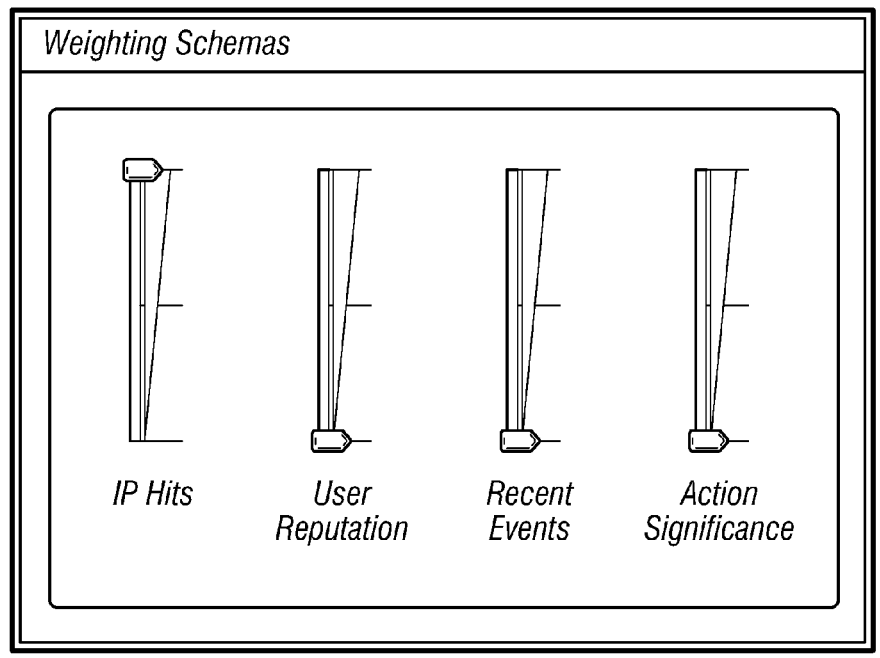
FIG. 4 is a diagram depicting adjustable sliders associated with evaluation criteria according to one embodiment of the invention.

The method continues at step 330 where a mechanism for dynamically modifying the default weightings applied in step 320 is provided. FIG. 4 illustrates one embodiment of such a mechanism. As shown in FIG. 4, the mechanism may be implemented as a window or pane in the graphical user interface with one or more sliders associated with each evaluation criteria available to be adjusted. In another embodiment, a user may be provided a field to enter or update the value of a given evaluation criteria with a discrete number or value.

Figure 6:
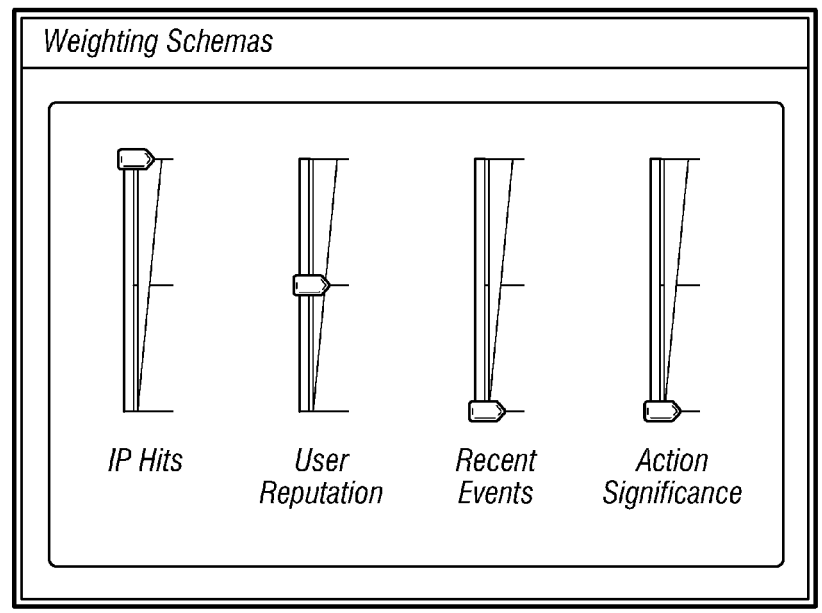
FIG. 6 is a diagram depicting adjustable sliders associated with evaluation criteria, which have been adjusted, according to one embodiment of the invention.
Figure 7:
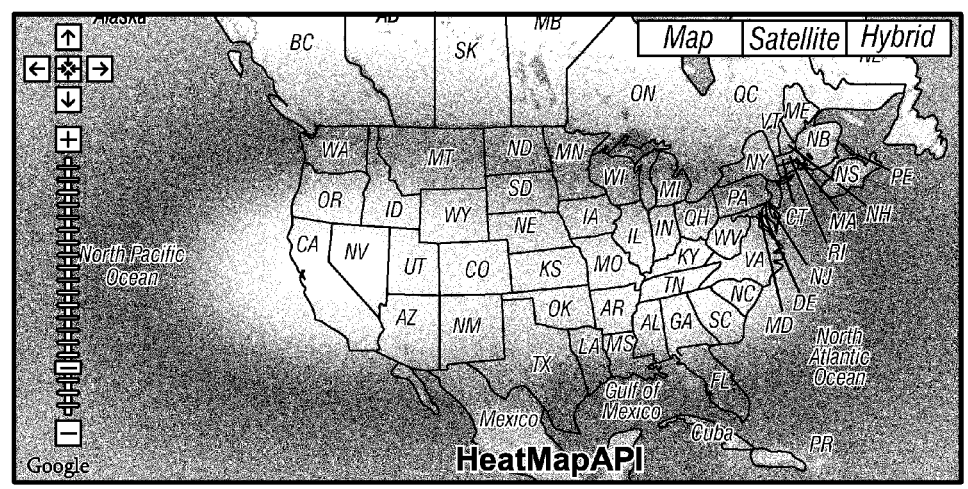
FIG. 7 is a graphical depiction of a heat map, reflecting adjusted evaluation criteria, according to one embodiment of the invention.

The method continues at step 340 where the adjusted evaluation criteria entered at step 330 is applied to the data collected at step 310. FIG. 6 illustrates an embodiment of the invention where a user has adjusted the evaluation criteria. Referring again to FIG. 3, the method returns to step 320 where the data is aggregated, based on the adjusted evaluation criteria, and collectively represented. FIG. 7 provides a collective representation of the heat map, based on a rendering consistent with the adjusted criteria.

What has been shown and discussed is a highly-simplified depiction of a programmable computer apparatus. Those skilled in the art will appreciate that a variety of alternatives are possible for the individual elements, and their arrangement, described above, while still falling within the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

What is claimed is:

1. A software monitoring application method, comprising:
   collecting, by a monitoring server, data regarding attributes of a user interacting with an application at a client site, to create a unified view of dissimilar data, said collected data having associated evaluation criteria;
   collectively representing said data evaluated according to said criteria via a display connected to the monitoring server;
   providing a mechanism for dynamically adjusting via the display said evaluation criteria assigned to selected data attributes, wherein said mechanism is configured to be dynamically modifiable;
   applying said adjusted evaluation criteria to said collected data; and
   collectively representing said data evaluated according to said adjusted criteria via said display,
   wherein the evaluation criteria is weighted, filtered, and adjusted prior to displaying the data, and wherein a filter value of the evaluation criteria is adjusted via a user manipulation of an adjustable control to assign a weighting value to the evaluation criteria via the display.

2. The method of claim 1, wherein said mechanism is manipulatable via a user interface.

3. The method of claim 2, wherein the mechanism further comprises sliding bars corresponding to said collected data.

4. The method of claim 1, wherein said collected data is representation by a heat map report.

5. The method of claim 1, wherein the collected data comprises at least one of data indicating:
a user's online reputation,
a time at which the user interaction occurred,
IP address,
geographic location,
the screen location of the user interaction,
where on the page the user scrolls,
what actions the user undertakes,
how long the user spends on the page,
number of purchases by user,
total amount of purchases by user, and
number of days since last purchase.

6. The method of claim 1, wherein the evaluation criteria comprises a filtering threshold.

7. The method of claim 1, wherein the evaluation criteria comprises a binary filter.

8. The method of claim 1, wherein the mechanism is independent of the application and plugs into applications at a plurality of client sites.

9. The method of claim 1, wherein the mechanism is configured to transmit the adjusted evaluation criteria to the client site during run time to be applied to said collecting of data and wherein the mechanism is applied, at the client site, to a plurality of applications to collect the dissimilar data.

10. The method of claim 1, wherein the mechanism comprises a toolkit for a software development platform, which links with the application at the client site.

11. The method of claim 1, wherein the toolkit is wrapped into a code of the application.

12. A computer readable storage medium containing a program, which, when executed on a processor, performs an operation comprising:
collecting, by a monitoring server, data regarding attributes of a user interacting with an application at a client site, to create a unified view of dissimilar data, said collected data having associated evaluation criteria;
collectively representing said data evaluated according to said criteria via a display connected to the monitoring server;
providing a mechanism for dynamically adjusting, via the display, said evaluation criteria assigned to selected data attributes, wherein said mechanism may be dynamically modified;
applying said adjusted evaluation criteria to said collected data; and
collectively representing said data evaluated according to said adjusted criteria via said display,
wherein the evaluation criteria is weighted, filtered, and adjusted prior to displaying the data, and
wherein a filter value of the evaluation criteria is adjusted via a user manipulation of an adjustable control to assign a weighting value to the evaluation criteria via the display.

13. The computer readable storage medium of claim 12, wherein said mechanism is manipulatable via a user interface.

14. The computer readable storage medium of claim 13, wherein the mechanism further comprises sliding bars corresponding to said collected data.

15. The computer readable storage medium of claim 12, wherein said collected data is representation by a heat map report.

16. The computer readable storage medium of claim 12, wherein the collected data comprises at least one of data indicating: a user's online reputation, a time at which the user interaction occurred,
IP address,
geographic location,
the screen location of the user interaction,
where on the page the user scrolls,
what actions the user undertakes,
how long the user spends on the page,
number of purchases by user,
total amount of purchases by user, and
number of days since last purchase.

17. The computer readable storage medium of claim 12, wherein the evaluation criteria comprises a filtering threshold.

18. The computer readable storage medium of claim 12, wherein the evaluation criteria comprises a binary filter.

19. The computer readable storage medium of claim 12, wherein the mechanism is independent of the application and plugs into applications at a plurality of client sites.

20. A system, comprising:
one or more processors; and
a memory containing a program, which when executed by the one or more computer processors is configured to perform an operation comprising:
collecting, by a monitoring server, data regarding attributes of a user interacting with an application at a client site, to create a unified view of dissimilar data, said collected data having associated evaluation criteria;
collectively representing said data evaluated according to said criteria via a display connected to the monitoring server;
providing a mechanism for dynamically adjusting via the display said evaluation criteria assigned to selected data attributes, wherein said mechanism may be dynamically modified;
applying said adjusted evaluation criteria to said collected data; and
collectively representing said data evaluated according to said adjusted criteria via said display,
wherein the evaluation criteria is weighted, filtered, and adjusted prior to displaying the data, and
wherein a filter value of the evaluation criteria is adjusted via a user manipulation of an adjustable control to assign a weighting value to the evaluation criteria via the display.

21. The system of claim 20, wherein said mechanism is manipulatable via a user interface.

22. The system of claim 21, wherein the mechanism further comprises sliding bars corresponding to said collected data.

23. The system of claim 20, wherein said collected data is representation by a heat map report.

24. The system of claim 20, wherein the collected data comprises at least one of data indicating:
a user's online reputation,
time at which the user interaction occurred,
IP address,
geographic location, the screen location of the user interaction,
where on the page the user scrolls,
what actions the user undertakes,
how long the user spends on the page,
number of purchases by user,
total amount of purchases by user, and
number of days since last purchase.

25. The system of claim 20, wherein the evaluation criteria comprises a filtering threshold.

26. The system of claim 20, wherein the evaluation criteria comprises a binary filter.

27. The system of claim 20, wherein the mechanism is independent of the application and plugs into applications at a plurality of client sites.

* * * * *